United States Patent Office 3,644,633
Patented Feb. 22, 1972

3,644,633
METHOD FOR COMBATING SOIL INSECTS AND TERMITES
Fritz Bachmann, Riehen, Switzerland, assignor to Ciba Limited, Basel, Switzerland
No Drawing. Filed Nov. 21, 1968, Ser. No. 777,906
Claims priority, application Switzerland, Nov. 24, 1967, 16,530/67
Int. Cl. A01n 9/28
U.S. Cl. 424—278                 1 Claim

ABSTRACT OF THE DISCLOSURE

The invention relates to a method of combating soil insects and termites with preparations containing as the active ingredient a carbamate of the general formula

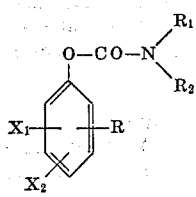

in which $R_1$ and $R_2$ represent hydrogen or an aliphatic group; $X_1$ and $X_2$ represent hydrogen, halogen, an aliphatic or nitro group, and R is the ortho- or meta-position to the carbamyloxy group represents an aldehyde group which is acetalized with alcohols and/or thioalcohols, preferably to form a heterocyclic ring containing oxygen and/or sulfur atoms.

---

It is known that the compounds of the formula

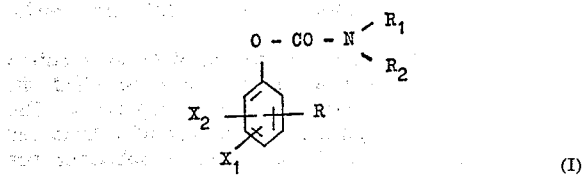

may be used as active ingredients in pesticidal preparations. In this formula $R_1$ and $R_2$, which may be identical or different, each represents a hydrogen atom or a lower alkyl or alkenyl group, $X_1$ and $X_2$, which may be identical or different, each represents a hydrogen atom, a lower saturated or unsaturated aliphatic group, a halogen atom or a nitro group, and R represents a grouping of the formula

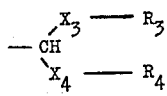

in ortho- or meta-position to the carbamyloxy group, wherein $X_3$ and $X_4$ may be identical or different and each represents an oxygen or a sulphur atom, $R_3$ and $R_4$ may be identical or different and each represents an alkyl, alkenyl or alkinyl group, or together with the whole grouping R may form a saturated or unsaturated heterocycle with 5 to 7 members which contains $X_3$ and $X_4$ as hetero atoms, and $R_3$ and $R_4$ may be substituted by lower aliphatic groups, by halogen atoms, or nitro or hydroxyl groups. These compounds possess valuable biocidal, especially insecticidal and acaricidal properties. Furthermore, they also possess bactericidal, fungicidal and molluscicidal properties. These carbamates are especially active against pests found in storerooms and against insects that damage plants, for example, aphids and prodenia.

The present invention is based on the surprising observation that the active substances defined by the general Formula I display a strong activity against soil insects and termites.

In order to control soil insects, the active substances of the Formula I may be used in one of the usual formulations described in detail in Dutch Auslegeschrift No. 5,513,024.

Quite generally, growing plants or plants shortly before their ripening may be treated with an aqueous dispersion, or an aqueous dispersion of one of the active substances may be poured over the soil before seeding or planting it, or the active substance as such may be worked into the soil by one of the conventional mechanical methods.

Termites are the most widely encountered animal pests damaging materials in warm climates. In contrast to other pests, they destroy not only materials on which they feed, that is to say cellulosic substances, but also a wide variety of other materials of diverse chemical compositions. Thus, apart from timber, paper and textiles, termites attack also plastics, rubber, lacquers, leather, bitumen and cement compositions and damage them. Even the smallest amount of damage caused by eating termites may have an extremely serious effect because having been attacked in this manner, for example, electric gear, cables or machine parts may be left completely useless.

Since it is not feasible to combat the termites directly, the safest way to prevent destruction of the technical appliances is protect the materials from termite damage. In this connection, not only the contact effect but also the gas phase effect of the active substances of this invention can be utilised.

At the present stage, with the use of suitable substances and methods, it is also possible to protect non-textile materials against termite damage by impregnating them with the active substances of the Formula I, or by incorporating such active substances with the starting materials. Such a treatment is not necessarily intended to destroy the pests, but at the same time it may render the materials resistant to them.

Anti-termite substances must satisfy various special requirements. Inter alia, for example, they must withstand the heat-treatment required in the manufacture and processing of the non-textile materials to be protected, and they must be stable towards extraneous substances, for example, plastizers or foaming agents without affecting the anti-termite protection. Moreover, the preparations must permanently protect the materials concerned and remain stable even in tropical climate. They must not affect the quality and properties of the materials concerned and finally they must be physiologically acceptable to both humans and farm animals.

The active substances of the Formula I satisfy all these conditions.

Accordingly, the present invention is concerned with the use of the carbamates of the general formula

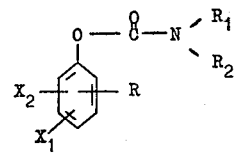

for controlling soil insects and termites. In this formula $R_1$ and $R_2$ may be identical or different and each represents hydrogen, a lower alkyl or alkenyl group; $X_1$ and $X_2$ may be identical or different and each represents hydrogen or a lower saturated or unsaturated aliphatic group, a halogen atom or a nitro group, and R represents a grouping of the formula

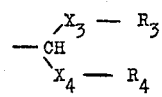

which is in ortho- or meta-position to the carbamyloxy group; $X_3$ and $X_4$ may be identical or different and each represents an oxygen or sulphur atom; $R_3$ and $R_4$ may be identical or different and each represents an alkyl, alkenyl or alkinyl group or together with the whole group $R_1$ may form a saturated or unsaturated heterocycle having 5 to 7 members which contains $X_3$ and $X_4$ as hetero atoms, and $R_3$ and $R_4$ may be substituted by lower aliphatic groups, halogen, a nitro or hydroxyl group. The carbamates may be used with an appropriate vehicle and optionally in admixture with other known agents suitable for combating soil insects and/or termites.

The lower alkyl, alkenyl and alkinyl groups indicated above for $R_{1-4}$, $X_1$ and $X_2$ usually contain 1 to 4 carbon atoms. The lower aliphatic groups, which are possible substituents for $R_3$ and $R_4$, usually contain 1 to 4 carbon atoms and are preferably corresponding alkyl groups which may be interrupted by hetero atoms, for example, oxygen, sulphur or nitrogen or substituted as indicated for $R_3$ and $R_4$. Especially preferred are compounds in which $R_1$, $X_1$ and $X_2$ each represents hydrogen, $R_2$ represents a methyl group and $R_3$ and $R_4$ are linked together so that R becomes a 5- to 7-membered, especially 5-membered, heterocycle in which $X_3$ and $X_4$ each represents sulphur and/or oxygen, preferably oxygen.

Accordingly, the following compounds are especially valuable:

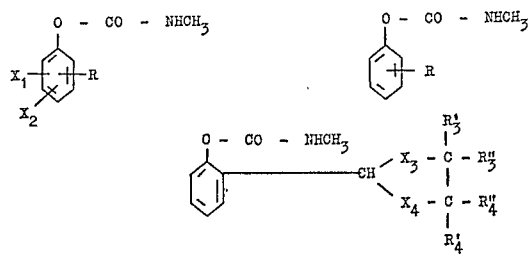

in which $X_{1-4}$ and R have the above meanings and $R_3'$, $R_3''$, $R_4'$ and $R_4''$ each represents hydrogen or an unsaturated or preferably saturated lower hydrocarbon group containing 1 to 4 carbon atoms, which itself may be substituted by halogen, hydroxyl, lower alkoxy or lower alkenyloxy, or together may represent a multiple bond.

The following examples illustrate the invention:

EXAMPLE 1

(a) Controlling the cabbage-root fly [*Phorbia brassicae* Bouché].

Cauliflower was planted on May 2. On May 8, 100 cc. of an 0.05% aqueous solution of wettable powder prepared from the active substance of the formula

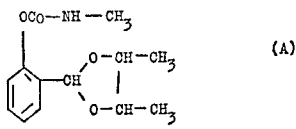

was poured over each plant.

Evaluation was carried out on June 15 by counting the live maggots, and the damage caused to the (washed) roots was designated by the values 0 to 5.

The following results were obtained:

| Treatment | Number of plants | Damage grouping in percent | | | | | | Number of maggots |
|---|---|---|---|---|---|---|---|---|
| | | 0 | 1 | 2 | 3 | 4 | 5 | |
| None | 36 | | 3 | 47 | 47 | 3 | | 30 |
| 0.05% solution of active substance (A) | 36 | 36 | 53 | 11 | | | | 0 |

(b) White cabbage was planted on July 7. On July 14, 100 cc. of active substance A (see under (a) above) was poured over each cabbage plant. Evaluation was carried out on August 15 as described under (a) above.

| Treatment | Number of plants | Damage grouping in percent | | | | | | Number of maggots |
|---|---|---|---|---|---|---|---|---|
| | | 0 | 1 | 2 | 3 | 4 | 5 | |
| None | 38 | 8 | 18 | 47 | 21 | 3 | 3 | 26 |
| 0.05% solution of active substance (A) | 39 | 44 | 46 | 10 | | | | 3 |
| Diazinone 0.1% EC 25 | 38 | 39 | 50 | 11 | | | | 6 |

EXAMPLE 2

(a) Controlling the turnip root fly [*Phorbia floralis* Fallén].

When the root of the radish variety "Ostergruss" was beginning to thicken on July 26, the soil was treated with 2 litres per square metre of an 0.05% aqueous solution of the active substance A. Evaluation was carried out on August 24 by counting the infestation found on each of 20 radishes.

Percent infestation—untreated _____ 70
Percent effect—0.05% WP 50 substance A _____ 100
0.1% diazinone—EC 25 _____ 79

(b) The procedure used in another test was as described under (a) above. The treatment was carried out on August 29, the evaluation on September 25, by checking the infestation on 50 (untreated 100) radishes. The following results were obtained:

Percent infestation—untreated _____ 72
Percent effect—0.05% A WP 50 _____ 83

EXAMPLE 3

Combating white grubs [Larvae of *Melolontha melolontha L*].

Shortly before earthing up the potatoes in a potato field, plots of 5 square metre each were parcelled off, according to the block variation, in 4 repetitions. The preparations were applied in an amount of 2 litres per square metre, equal to 5 kg. of active substance per hectare.

On September 7, the potatoes were lifted and inspected for damage by white grubs. The grubs were in the second larval state.

The following results were obtained:

| Damaged tubers | In percent by numbers | In percent by weight |
|---|---|---|
| Untreated | 7.5 | 10 |
| Active substance A | 2.7 | 1.5 |
| Aldrin | 2.2 | 1.3 |

EXAMPLE 4

Combating termites [*Kalotermes flavicollis*].
The active substance of the formula

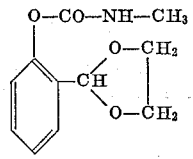

was applied in an amount of 2 g. per square metre to pieces of pine wood 20 x 20 x 5 mm., and 3 weeks later the examination was carried out.

In the force and repellency tests, the untreated control samples were extensively damaged.

The samples treated with the substance (B) displayed a repellant and toxic activity. No damage caused by termites was detectable.

| Sample | Damage within 30 days | | Toxicity | | |
|---|---|---|---|---|---|
| | Force | Repellency | Force | Repellency | Toxicity |
| Untreated | +++++++ | | Normal Toxic | Normal Toxic | 90 |
| Compound (B) | 0 | 0 | | | +++ |

| Sample | Repellant effect: percent termites removed from sample |
|---|---|
| Untreated | 2.6 |
| Compound (B) | 100 |

EXAMPLE 5

Combating elateridae larvae [wire worms].

The tests were made in block variation with 3 repetitions on plots of 25 square metres each. The soil was sprayed with 400 litres per hectare and respectively sprinkled with granulate and then slightly worked over. A few days later, rows of maize were seeded. When the emerging plants had reached a height of at least 10 cm., the number of plants, except in the region of the edges, in each plot was counted. Infestation by wire worms reduces the number of plants.

Varieties tested: Donja Kupčina (DK) and Veleševac (V).
Location of test: Jugoslavia
Seeding date: (V)—Apr. 30, 1968 (DK)—May 11, 1968
Results (application of all preparations in an amount of 5 kg. per hectare):

| Preparation | Relative number of plants | |
|---|---|---|
| | DK on June 28 | V on June 29 |
| Untreated | 100 | 100 |
| B WP 50 | 121 | 104 |
| A WP 50 | 124 | 104 |
| A G 6 | 127 | 109 |
| Endosulfan WP 35 | 115 | 105 |
| Bromophos sprinkling agent | | 98 |

The abbreviations used in the example mean:

EC 25=emulsion concentrate containing 25% of an active ingredient,
WP 50=wettable powder containing 50% of an active ingredient,
G 6=granulates containing 6% of an active ingredient.

I claim:

1. A method for combating soil insects, which comprises applying to the soil site to be treated a soil insecticidal amount of the compound of the formula

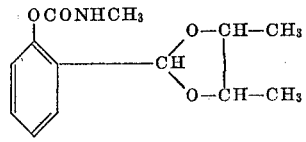

References Cited

UNITED STATES PATENTS 3,349,115  10/1967  Weil et al. _____ 424—277
3,349,116  10/1967  Weil et al. _____ 424—300

ALBERT T. MEYERS, Primary Examiner

V. D. TURNER, Assistant Examiner

U.S. Cl. X.R.

424—276, 277, 300